(12) United States Patent
VanDenberg et al.

(10) Patent No.: US 8,235,403 B2
(45) Date of Patent: Aug. 7, 2012

(54) SUSPENSION ASSEMBLY

(75) Inventors: Ervin K. VanDenberg, Massillon, OH (US); David H. Croston, Navarre, OH (US)

(73) Assignee: Air Suspensions, Inc., Massillon, OH (US)

(*) Notice: Subject to any disclaimer, the term of this patent is extended or adjusted under 35 U.S.C. 154(b) by 130 days.

(21) Appl. No.: 12/769,067

(22) Filed: Apr. 28, 2010

(65) Prior Publication Data

US 2011/0266764 A1 Nov. 3, 2011

(51) Int. Cl.
*B60G 3/12* (2006.01)
*B60G 3/14* (2006.01)
*B60G 3/18* (2006.01)

(52) U.S. Cl. .................. 280/124.116; 280/124.128

(58) Field of Classification Search .......... 280/124.116, 280/124.125, 124.128, 124.153, 124.157
See application file for complete search history.

(56) References Cited

U.S. PATENT DOCUMENTS

| | | | | |
|---|---|---|---|---|
| 4,934,733 A | * | 6/1990 | Smith et al. | 280/124.132 |
| 5,366,237 A | | 11/1994 | Dilling et al. | |
| 5,887,880 A | * | 3/1999 | Mullican et al. | 280/43.18 |
| 6,340,165 B1 | | 1/2002 | Kelderman | |
| 6,428,026 B1 | * | 8/2002 | Smith | 280/124.125 |
| 6,921,098 B2 | * | 7/2005 | VanDenberg et al. | 280/124.116 |
| 7,108,271 B2 | * | 9/2006 | Smith | 280/124.128 |
| 2003/0098564 A1 | * | 5/2003 | VanDenberg et al. | 280/124.157 |
| 2004/0188973 A1 | | 9/2004 | Molitor | |
| 2009/0146388 A1 | * | 6/2009 | Rauch, Jr. | 280/81.6 |

* cited by examiner

*Primary Examiner* — Joseph Rocca
(74) *Attorney, Agent, or Firm* — Sand & Sebolt

(57) ABSTRACT

A suspension system includes a frame mount assembly, a swing arm assembly and an air spring. The trailer includes a rail with top and bottom rail surfaces. The swing arm assembly is pivotally mounted to a pivot about a swing arm pivot axis located above the bottom rail surface when the suspension assembly is mounted to the trailer.

24 Claims, 12 Drawing Sheets

SUSPENSION ASSEMBLY

BACKGROUND OF THE INVENTION

1. Technical Field

The invention relates to suspension systems for vehicles, such as trailers and trucks. More particularly, the invention relates to a suspension assembly having an air spring. Even more particularly, the invention relates to a more compact air spring suspension assembly with the air spring located between frame rails of a vehicle to provide a lower center of gravity than traditional suspension systems.

2. Background Information

Truck or trailer suspension systems should be as safe, durable, and as economical as possible. Often these characteristics conflict and compete, thus necessitating a compromise of one characteristic against another characteristic, which often results in a suspension system being less than ideal. For example, safety considerations dictate that the suspension be sufficiently rigid in its various planes to maintain the vehicle's line of travel. However, safety also necessitates that the suspension be sufficiently flexible or resilient to allow (i.e. take up) deflections caused by articulation forces experienced during operation of the vehicle. Durability includes the ability to resist degeneration (damage) which occurs from the deflections. Durability conflicts with economical cost involved in achieving safety and durability.

One type of suspension, the trailing arm suspension, has a variety of undesirable characteristics. For example, trailing arm suspensions are brake reactive. That is, when a vehicle's brakes are applied, the suspension will tend to compress thereby reducing the suspension's effectiveness. Similarly, when the brakes are applied as the vehicle moves in reverse, the suspension will tend to rise up, and pivot about the single trailing arm pivot, again reducing the suspension's effectiveness. Further, most trailing arm suspensions suffer from dock walk because they move toward or away from the loading dock as the suspension moves up or down with the brakes locked. This movement is caused from air draining off the air springs, or as a result of loads added to or removed from the vehicle, or the temperature changes that occur as the trailer remains parked by the dock. Dock walk occurs primarily because of rotation of the beam, axle and tire assembly when the brakes are locked. As the suspension travels vertically with the brakes locked it rotates the tires causing the tires to move the vehicle horizontally. If the trailer is positioned adjacent a dock, it causes the trailer to move toward or away from the dock as a result of the movement or rotation about the single pivot point. Therefore, a better suspension system is needed.

BRIEF DESCRIPTION OF THE DRAWINGS

One or more preferred embodiments that illustrate the best mode(s) are set forth in the drawings and in the following description. The appended claims particularly and distinctly point out and set forth the invention. The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

The same reference numbers in different drawings refer to the same component.

DETAILED DESCRIPTION OF THE INVENTION

Figure 1:
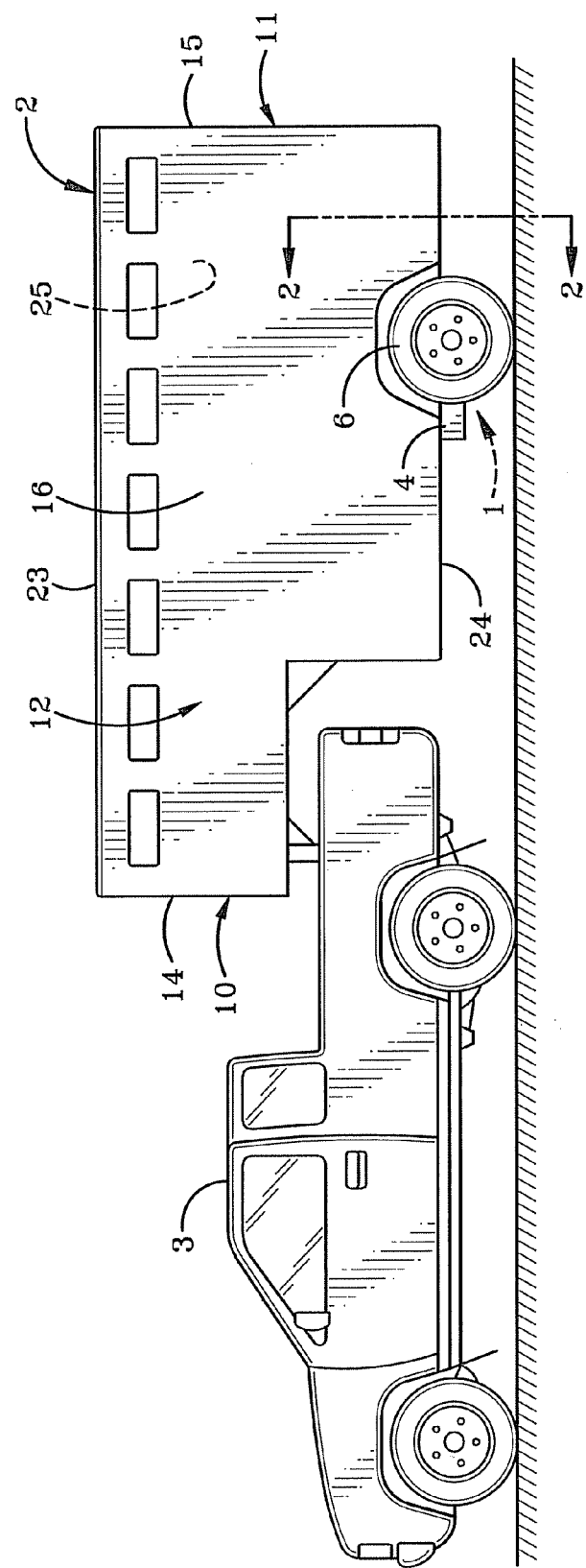
FIG. 1 is a diagrammatic side elevational view of a vehicle trailer on which the improved suspension assembly is mounted.
Figure 2:
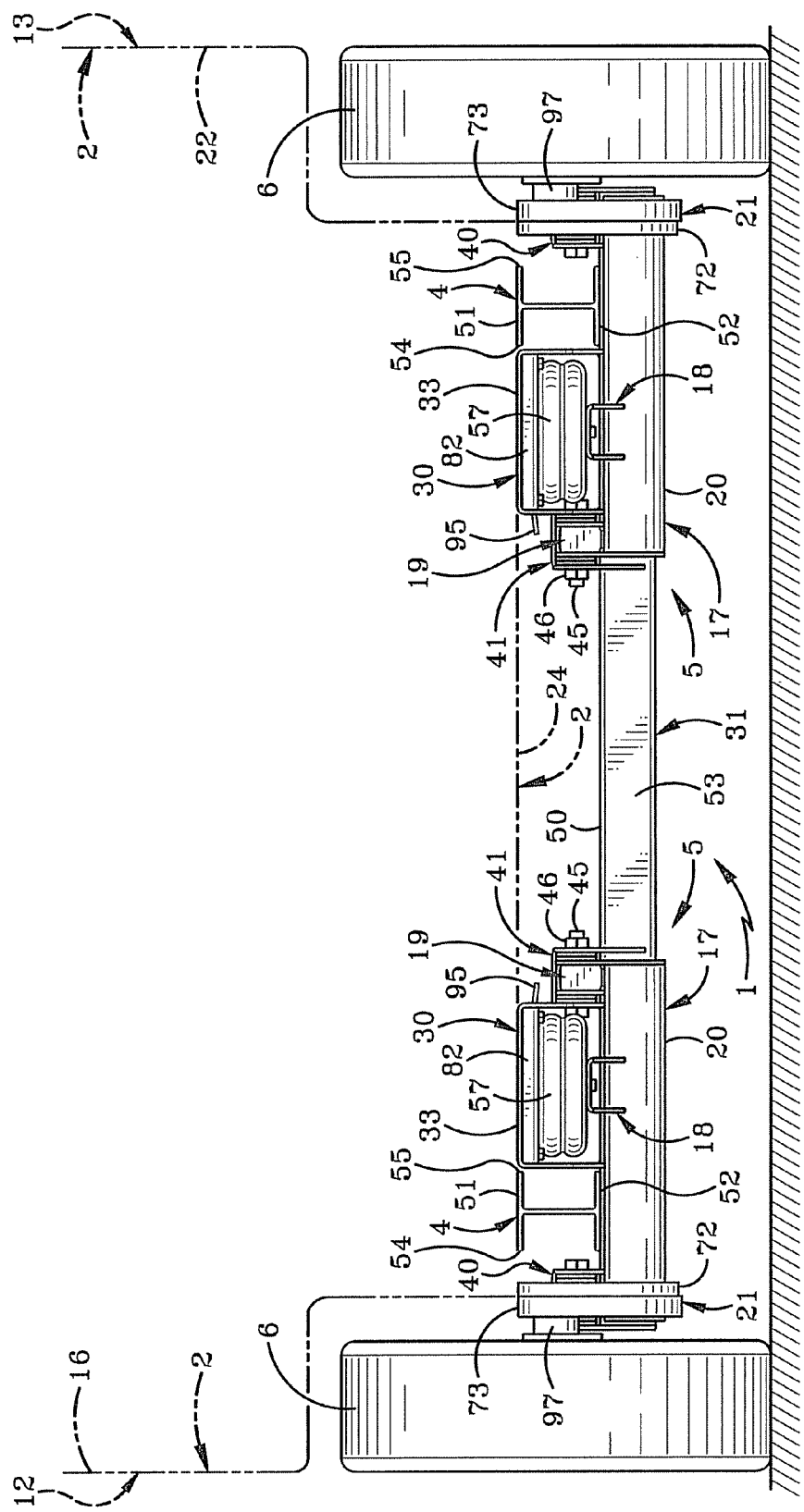
FIG. 2 is a rear elevational view of a pair of the improved suspension assemblies mounted on a trailer.

In FIG. 1, a vehicle suspension system indicated generally at 1 shown is mounted on a towed vehicle or trailer 2 being towed by a truck 3 or the towed vehicle. As shown in FIG. 2, the suspension system 1 includes a suspension assembly 5 with one suspension assembly 5 associated with each of the left and right tires 6 of the trailer 2. Wheels 6 are standard wheels each including a hub, rim mounted on the hub and a tire mounted on the rim. The suspension assemblies generally operate independent of one another. Even though two or more suspension assemblies 5 are used in a suspension system 1, this specification and figures will focus on the preferred embodiment of one suspension assembly 5 because the suspension assemblies are the same or mirror images of one another. The preferred embodiment of the suspension assembly 5 is shown in detail in FIGS. 3-11.

The trailer 2 has a front 10 and a back 11 (FIG. 1) defining therebetween a longitudinal direction, and left and right sides 12 and 13 defining therebetween an axial direction. Trailer 2 includes a container having a front wall 14, a back wall 15, left and right sidewalls 16 and 22, a top will 23 and a bottom wall or floor 24 which together define a cargo-carrying internal chamber 25 in which cargo is placed for transport. Floor 24 is typically substantially flat and horizontal when trailer 2 is connected to vehicle 3. The trailer 2 also includes a support frame below the container which includes left and right rigid frame rails 4 extending longitudinally along a length of the trailer 2. The frame rails 4 are typically formed of metal and may be I-beams and are adjacent and spaced axially inward of the left and right wheel 6 respectively. Each frame rail 4 has a top upwardly-facing surface 51 and a bottom downwardly facing surface 52 therebelow. Each of surfaces 51 and 52 is typically substantially horizontal when trailer 2 is hitched to vehicle 3. The bottom of the floor 24 is rigidly secured to top surface 51 of rails 4. Each rail 4 has left and right sides 54 and 55. Left and right sides 54 and 55 of the left rail 4 serve outboard and inboard sides respectively while the opposite is true of the right rail 4.

A pair of the improved suspension assemblies is mounted to a respective frame rail 4 generally adjacent a wheel 6. Notice that a significant portion of the suspension assembly 1 is located adjacent to and generally between top surface 51 and bottom surface 52 of a frame rail 4. In contrast to earlier suspension assemblies, a signification portion of the preferred embodiment of the suspension assembly 1 is above the bottom surface 52 of the frame rail 4, as shown in FIG. 2 and discussed in greater detail below. This in turn allows for the floor of the trailer 2 to be lower than prior suspension assemblies and allows the center of gravity of the trailer 2 to be lowered. A lower center of gravity improves the stability of the trailer 2 and reduces the chances of the trailer 2 tipping over and allows for a larger cargo-carrying capacity while remaining within regulatory dimension requirements for trailers.

Figure 3:
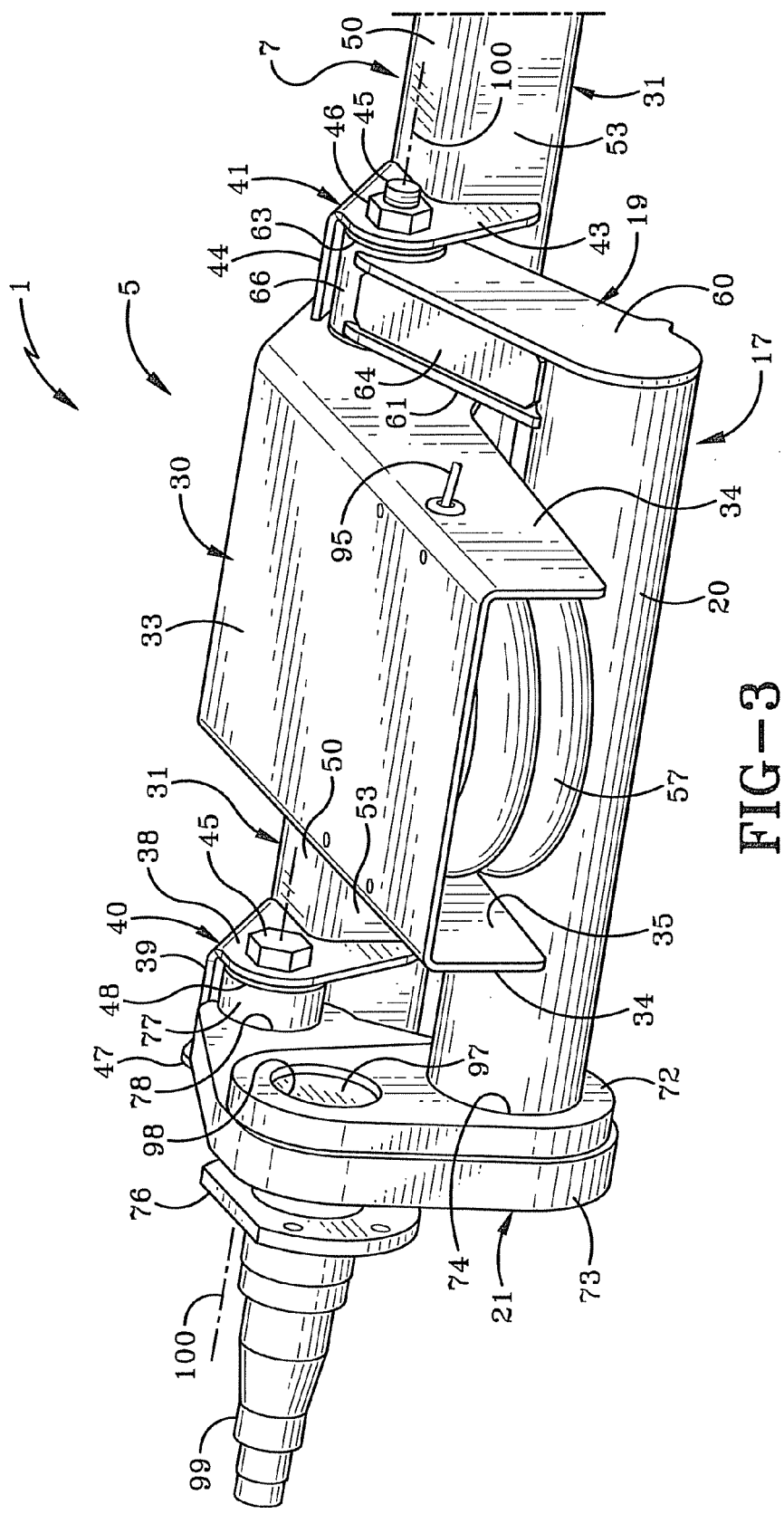
FIG. 3 is a perspective view of the improved vehicle suspension assembly.
Figure 4:
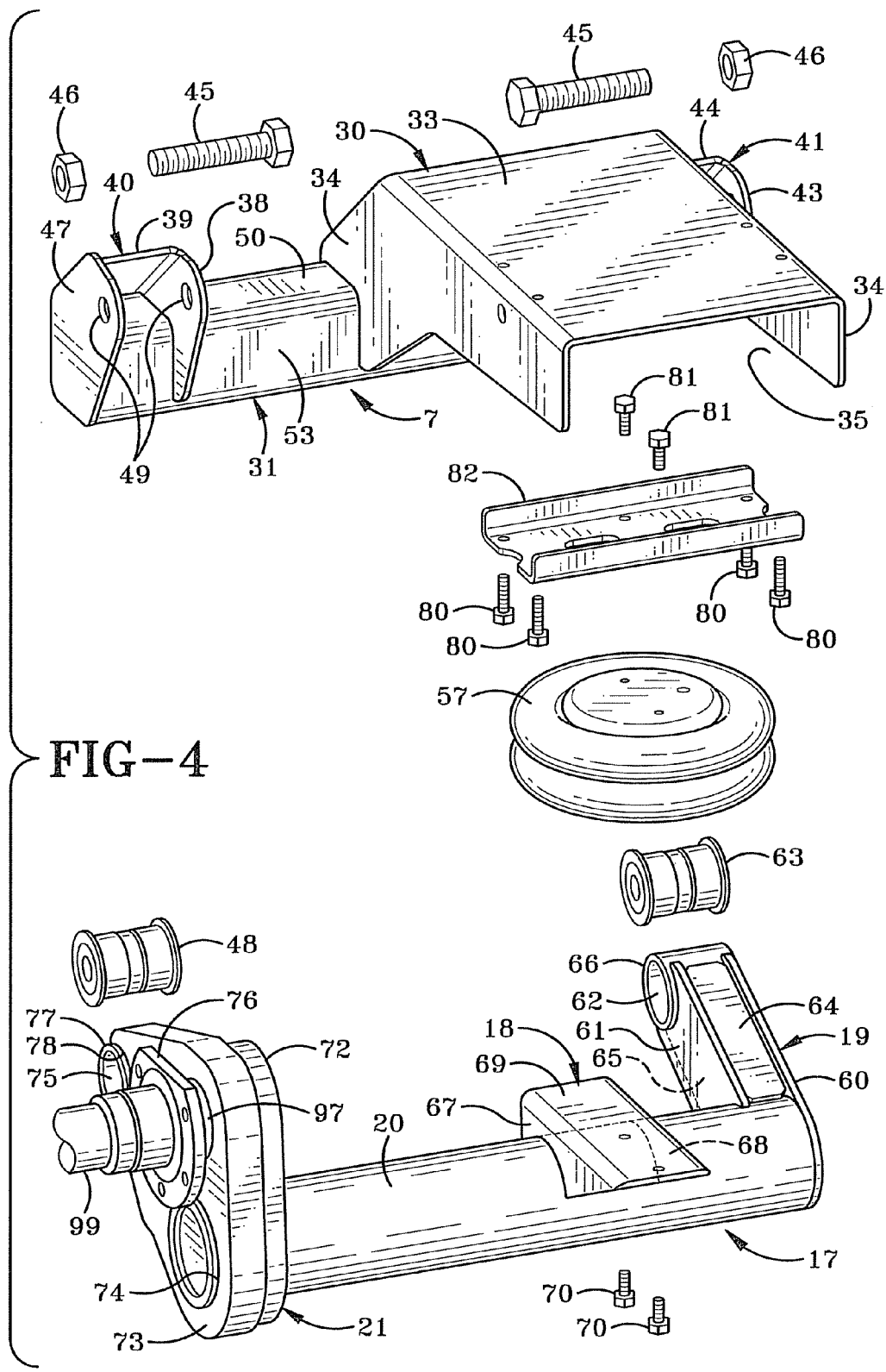
FIG. 4 is an exploded perspective view of the improved suspension assembly.
Figure 5:
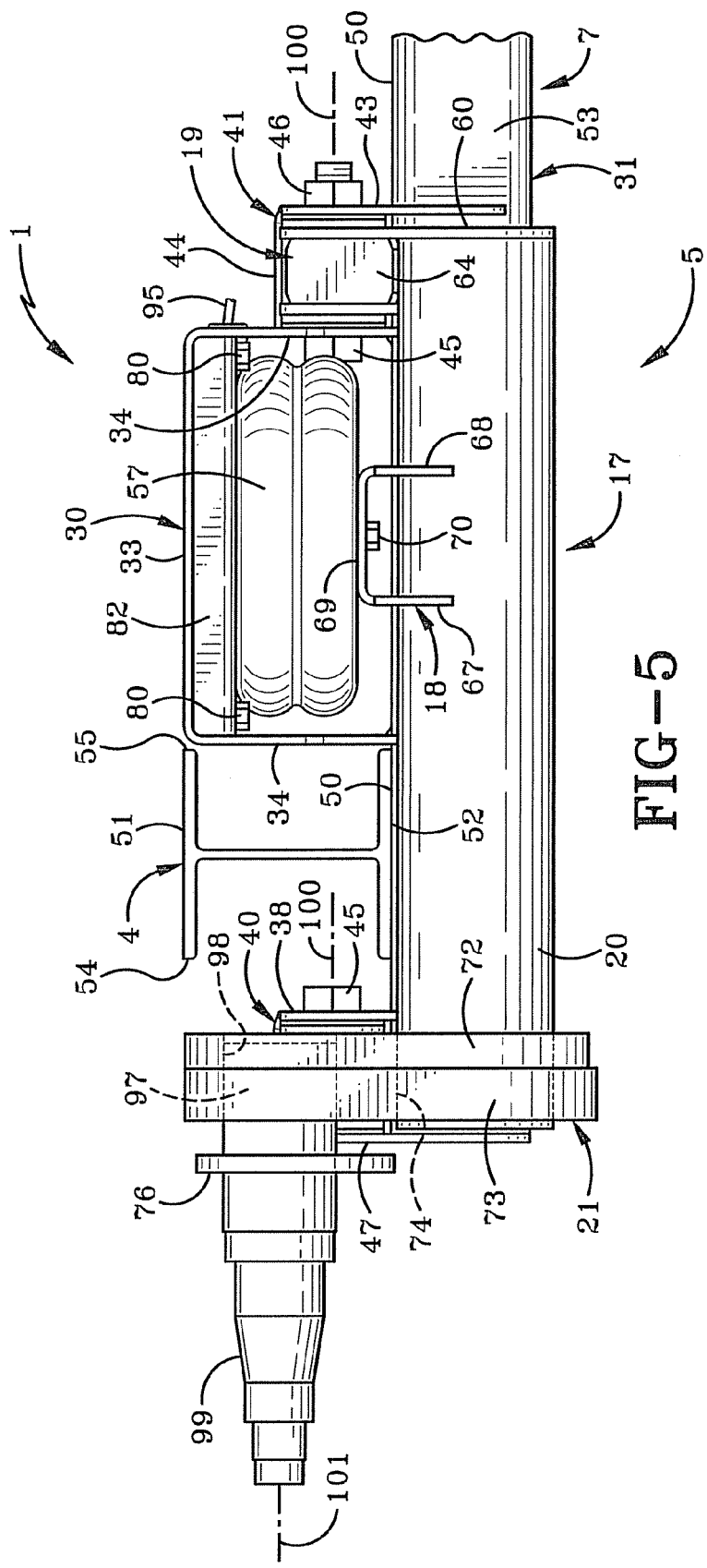
FIG. 5 is a rear view of the improved suspension assembly mounted to the beam of a trailer.
Figure 6:
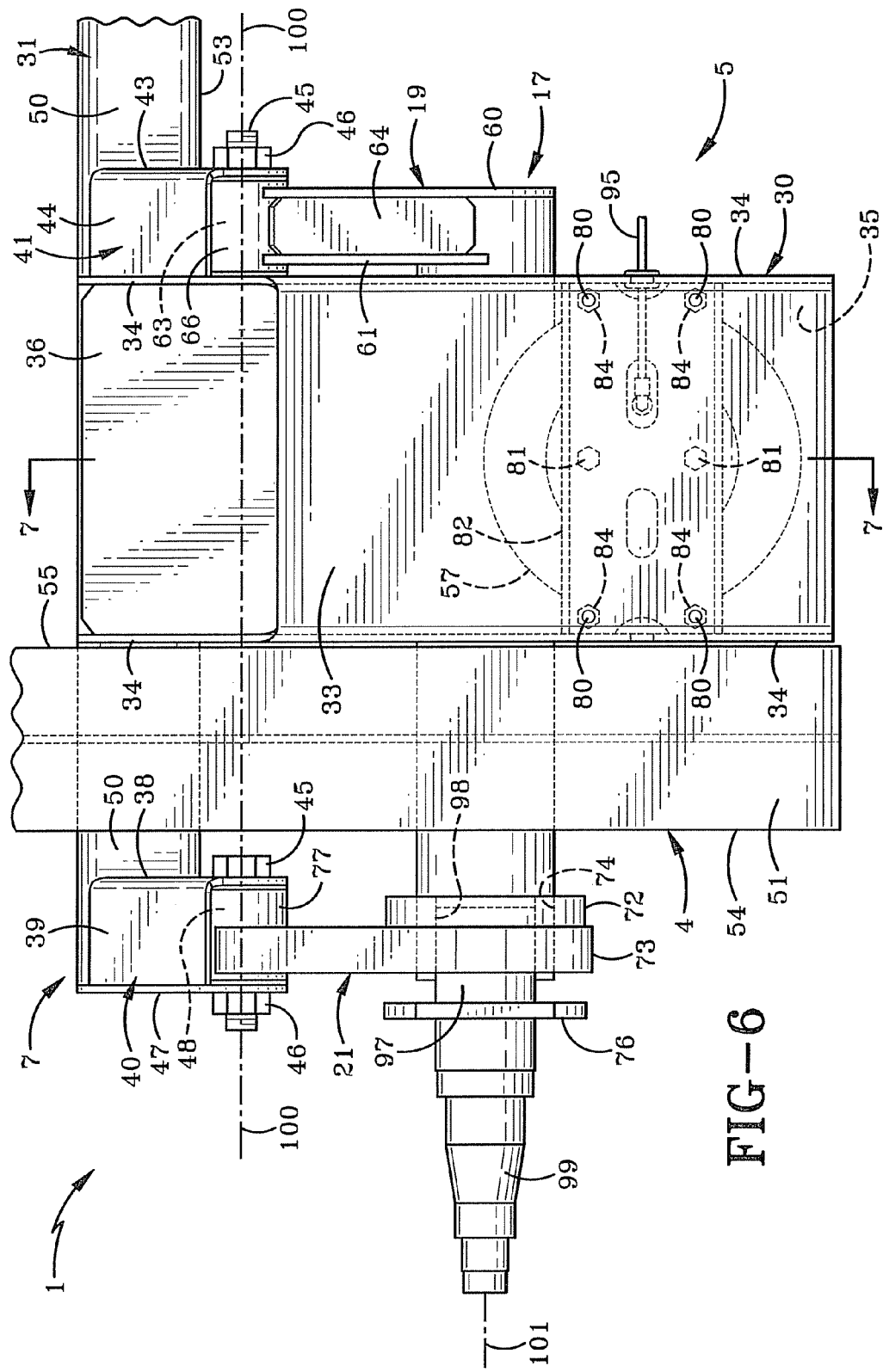
FIG. 6 is a top plan view of the improved suspension assembly.
Figure 7:
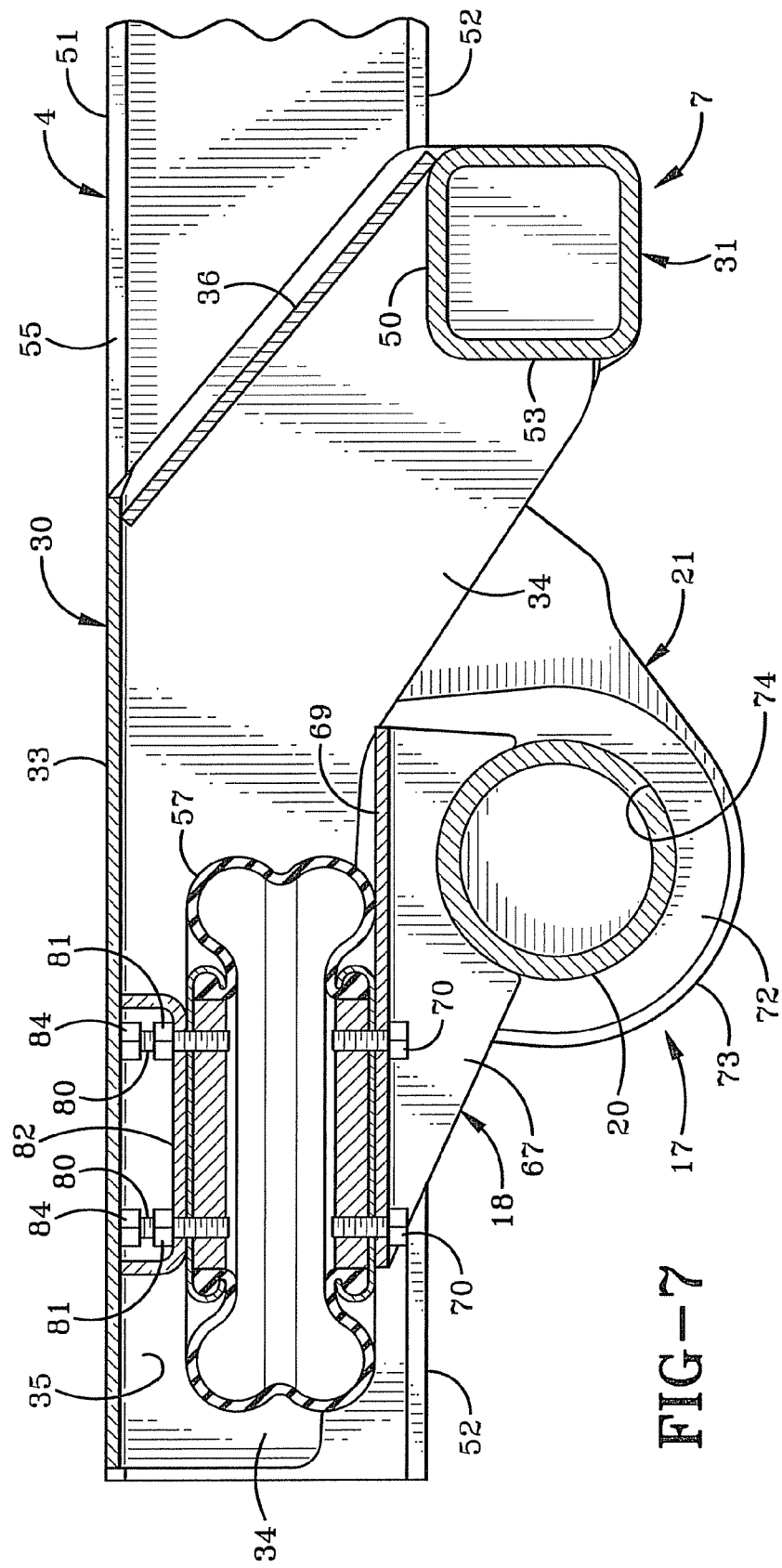
FIG. 7 is a side cross-sectional view taken on line 7-7 of FIG. 6.

The preferred embodiment of the suspension assembly 5 as best shown in FIGS. 3 and 4, includes a frame mount assembly 7, a swing arm assembly 17, the spindle arm 21 and a spindle 99 with a spindle base 97 and which wheel 6 is rotatably mounted about a spindle axis 101. The frame mount assembly 7 includes an air spring housing 30, support beam 31, a first pivot mount 40 (pivot assembly) and a second pivot mount 41. The frame mount assembly 7 generally spans from the left side 12 to the right side 13 of the trailer 2 and is located below the bottom surface 52 of the frame rails 4. The swing arm assembly 17 is generally positioned parallel to the frame mount assembly 7 below the bottom surface of a frame rail 4 and extends across the left and right sides 54 and 55 of the frame rail 4. The spindle arm is rigidly attached to the swing arm assembly 17 and is located on the left side 54 of the frame rail 5 of the left suspension assembly 105 in FIG. 2. The first pivot mount 40 is positioned at least partially above the bottom surface 52 and left of the left side 54 of the frame rail 4 of the left suspension assembly 105 in FIG. 2. The second pivot mount 41 is positioned at least partially above the bottom surface 52 and right of the right side 55 of the frame rail 4 of the left suspension assembly 105 in FIG. 2.

In the preferred embodiment, the suspension assembly 5 is rigidly attached to the trailer 2 by bolting and/or welding the support beam 31 to the frame rails 4. The frame mount assembly 7 can be attached to the trailer 2 by other ways as understood by those of ordinary skill in the art. In the preferred embodiment, the support beam 31 is a generally square piece of steel with four flat surfaces; however, the support beam 31 can be round or other shapes in alternative embodiments. The support beam 31 is hollowed steel (not solid) in the preferred embodiment. However, in other embodiments the support beam 31 may be made of solid steel or other materials or filled with other materials. When the support beam 31 is of sufficient strength, it unifies independent suspension assemblies 5 and does not rely on the trailer frame for bending strength. Because the support beam 31 is attached to the frame rail 4 it does not travel up and down with the wheel 6 as do traditional axles.

The air spring housing 30 is preferably, generally box shaped with a flat horizontal tope wall having a top 33, a slanted back wall 36 and two side walls 34. These walls help define an air spring mounting chamber 35. The air spring housing 30 and air spring mounting chamber 35 are generally between the top surface 51 and the bottom surface 52 of the frame rail 4. The two side walls 34 straddle and are in contact with the upper surface 50 and a second side surface 53 of the support beam 31 and may be welded to these two surfaces of the support beam 31 at these contacts. The slanted back wall 36 may contact the support beam 31 at a bottom edge wall 36 and may be welded to the support beam 31 at this contact. The components used to form the frame mount assembly 7 are metal and of sufficient thickness so that the suspension assembly 5 is sufficiently rigid and durable.

Figure 8:
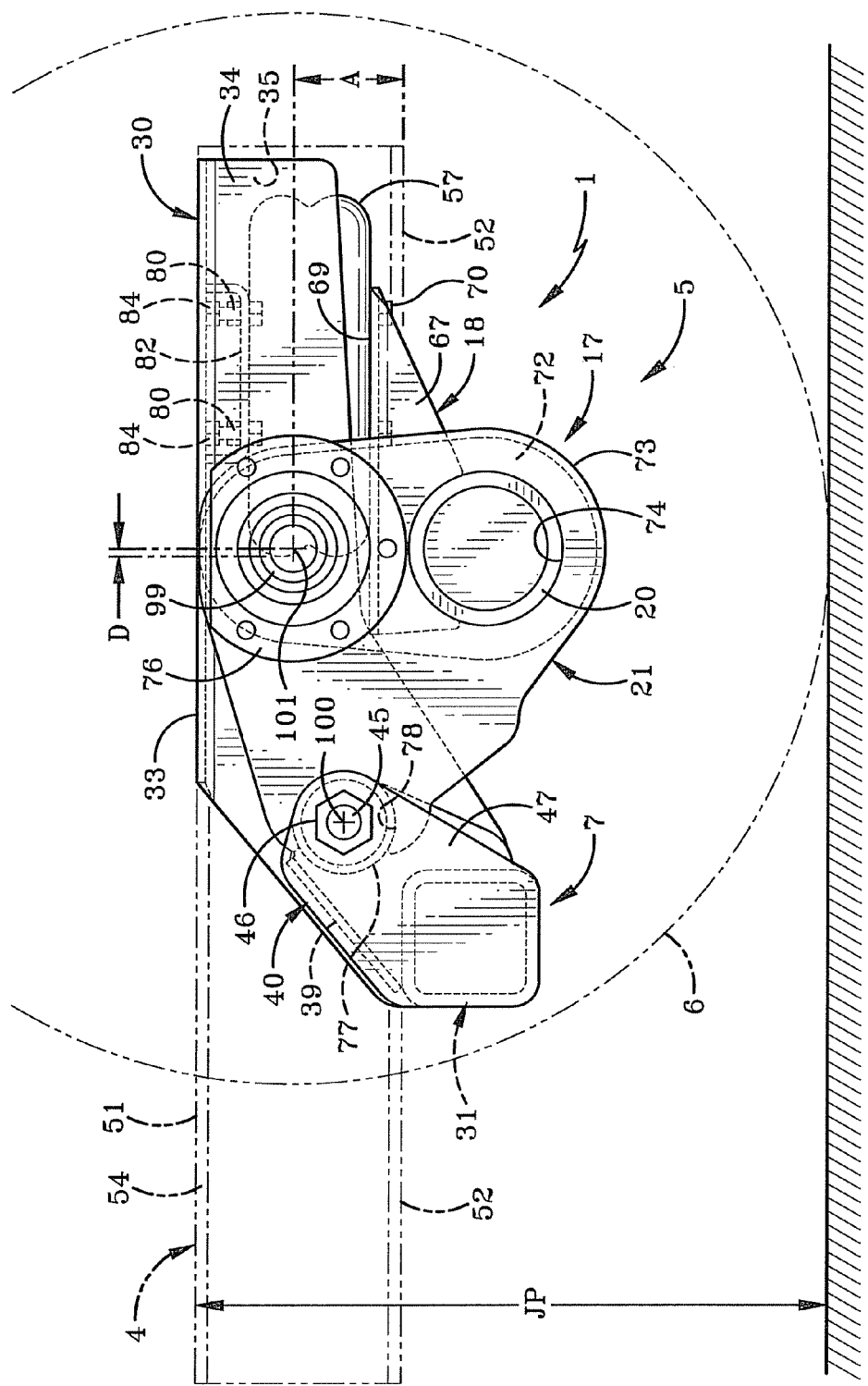
FIG. 8 is a side elevational view with the improved suspension assembly in a full jounce position.
Figure 9:
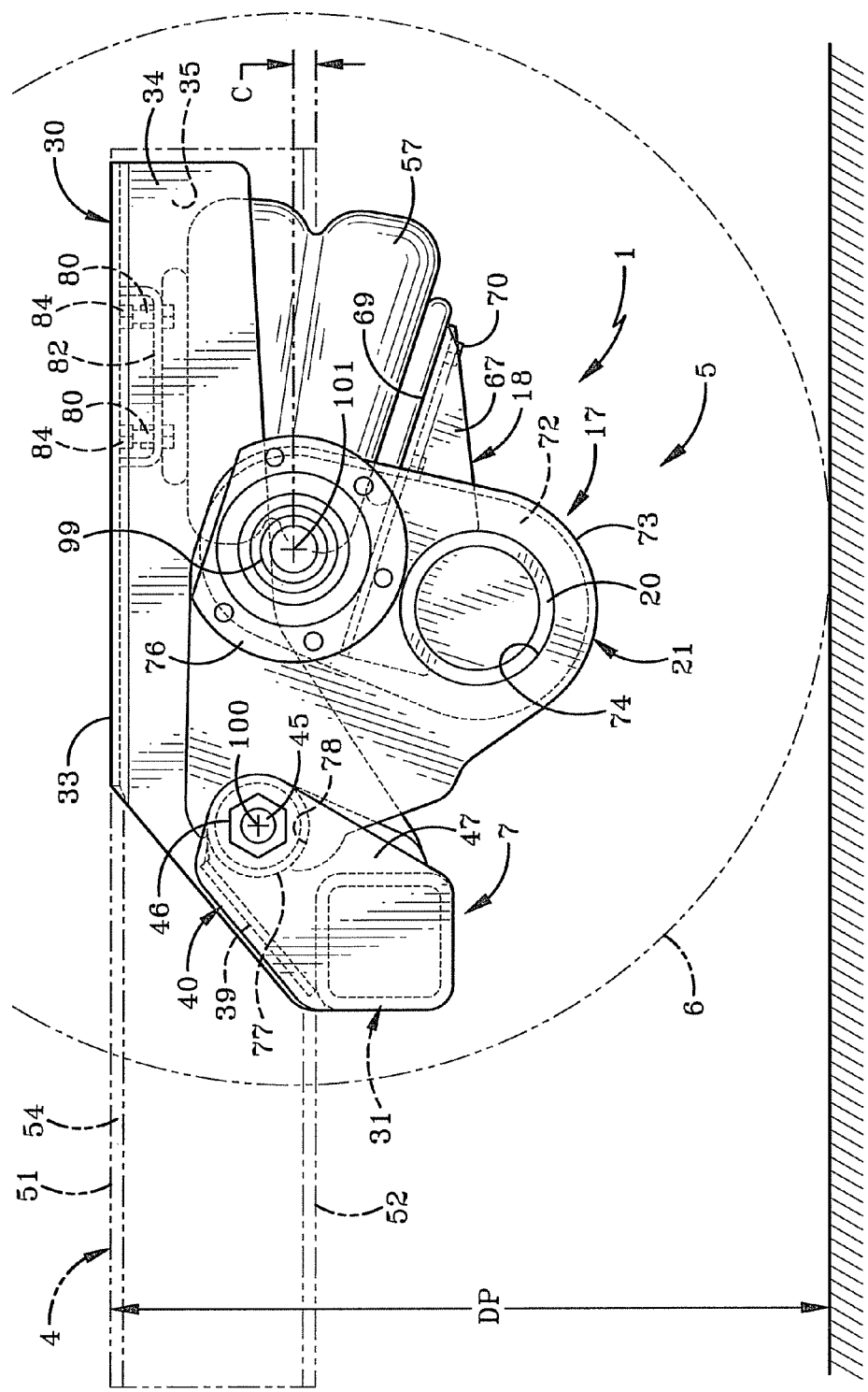
FIG. 9 is a view similar to FIG. 8 with the improved suspension assembly in the design position.
Figure 10:
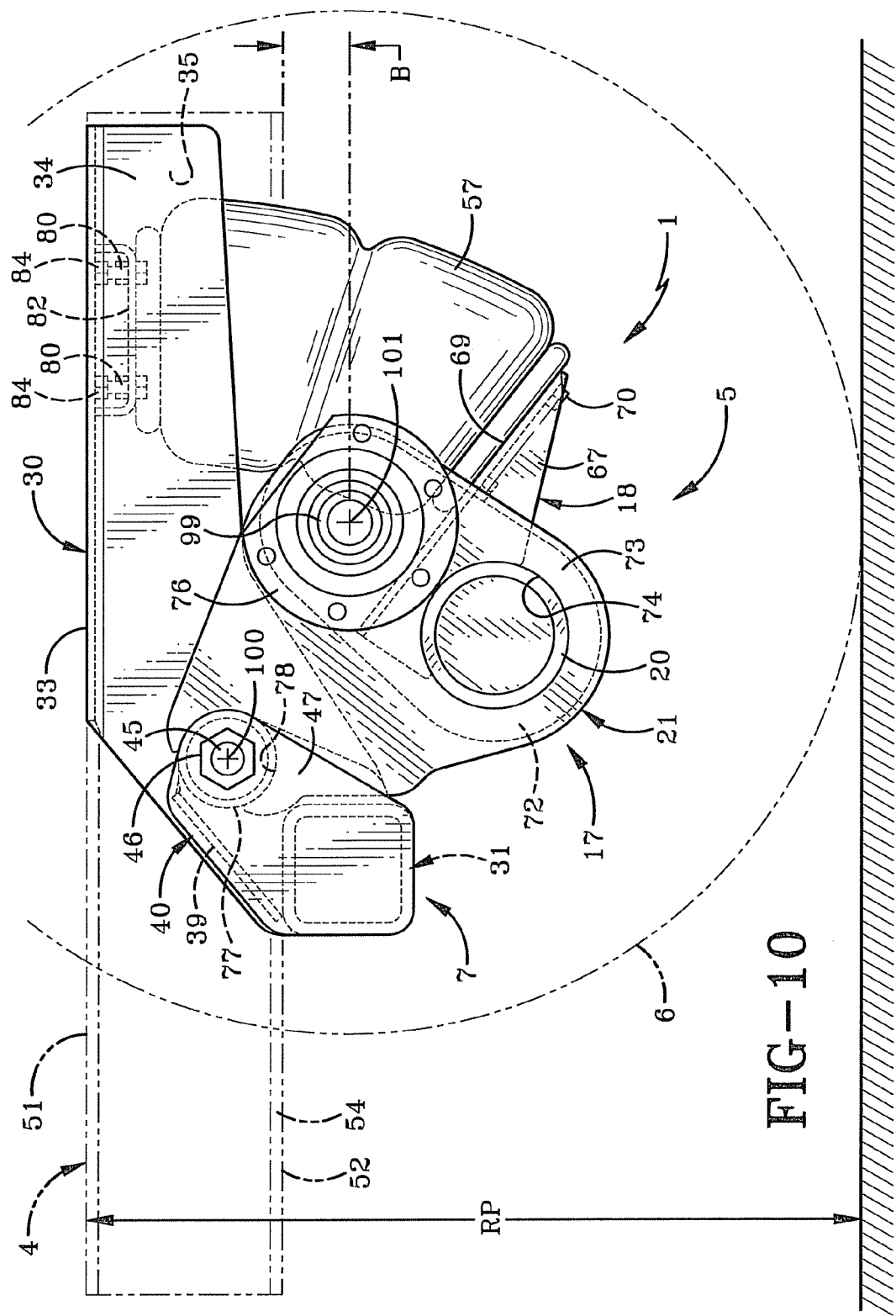
FIG. 10 is a view similar to FIGS. 8-9 with the improved suspension assembly in the full rebound position.

First pivot mount 40 and second pivot mount 41 are formed on an upper surface 50 of the support beam 31. The pivot mounts 40, 41 are rigidly secured to beam 31 and are formed to allow the swing arm assembly 17 to pivot about a swing arm assembly pivot axis 100 that is above the bottom surface 52 of the frame rail 4 as shown in FIGS. 8-10. In the preferred embodiment, the first pivot mount 40 is formed with a pair of side walls 47, 38 and a back wall 39 rigidly secured to and extending between walls 47 and 38. In the preferred embodiment, the second side wall 38 straddles and is contact with the upper surface 50 and a second side surface 53 of the support beam 31 and the first side wall 47 is in contact with the outer edges of the support beam 31. The side walls 47, 38 are parallel with each other and have a pair of holes 49 formed in them to allow a bolt 45 to pass through them. The bolt 45 is configured to secure an assembled bushing 48 within a cylindrical member 77 of the swing arm assembly 17 in the first pivot mount 40. The back wall 39 is between the side walls and is generally at right angles to each of the side walls 47, 38. The side walls 47, 38 and back wall 39 of the first pivot mount 40 can be formed by bending a piece of metal to form these components. Alternatively, the side walls 47, 38 and back wall 39 of the first pivot mount 40 can be formed with one or more pieces of metal and are attached to the support beam 31 by welding them to the support beam 31.

The second pivot mount 41 is best seen in FIG. 3 and is formed with a side wall 43 that is similar the wall 38 of the first pivot mount 40. One of the side walls 34 of the air spring housing 30 can form a second wall of the second pivot mount. Similar to the first pivot mount 40, holes are formed in the side wall 43 of the second pivot mount and the side wall 34 of the air spring housing 30 to allow a bolt 45 to secure a second assembled bushing 63 in a cylindrical member 66 of the swing arm assembly 17. These pivot connections 40, 41 allow the swing arm assembly 17 to rotate about the swing arm assembly pivot axis 100. The side wall 43 straddles and is in contact with the upper surface 50 and the second side surface 53 of the support beam 31. A back wall 44 of the second pivot mount 41 is formed at right angles to the side wall 43 and is in contact with the support beam 31 at a bottom edge of the back wall 44. The side wall 43 and back wall 44 may be formed by bending a single piece of metal and welding the bent metal to the support beam 31 where side wall 43 and back wall 44 contact the support beam 31. Alternatively, the side wall 43 and back wall 44 may be individually fabricated and then welded together and welded to the support beam 31.

The swing arm assembly 17 includes a rigid swing arm 19, a rigid swing arm beam 20, a rigid air spring support 18 and a rigid spindle arm 21. These components are each fabricated out of one or more pieces of metal so that when they are assembled, the swing arm assembly 17 is sturdy and rigid. When the swing arm assembly 17 is pivotally attached to the frame mount assembly 7, the suspension assembly 5 is durable and able to support the weight of a fully loaded trailer 2.

In the preferred embodiment, the swing arm 19 may be fabricated with a first side wall 60 a second side wall 61, a top wall 64, a bottom wall 65 (not shown) and the cylindrical member 66. As shown in FIG. 4, the first and second side walls 60, 61, top wall 64 and bottom wall 65 can be connected together to form a generally rectangular shape. The first and second side walls 60, 61 are rounded at one end to form a curved and concave edge the same outside diameter of the cylindrical member 66. The cylindrical member 66 is attached to this end of the swing arm 19 with the rounded portions of the first and second walls 60, 61 wrapping at least partially around the cylindrical member 66. The cylindrical member 66 is adapted with an opening 62 to allow the assembled bushing assembly 63 to be mounted in the cylindrical member 66. At a second end of the swing arm 19, the first side wall 60 is curved to overlay a circular end of the swing arm beam 20. Furthermore, at the second end of the swing arm 19, the second side wall 61 is curved and concave to wrap at least partially around the swing arm beam 20. The second side wall 61 is curved to wrap at least partially around the swing arm beam 20. In other embodiments, the swing arm beam 20 may be other shapes rather than round. The components of the swing arm 19 may be a metal such as a form of steel or made of another material. These components may be welded together or rigidly attached together in other ways.

In the preferred embodiment, the air spring support 18 is formed and mounted to the swing arm beam 20. The air spring support 18 is formed with a first side 67, a second side 68, and a top 69. The first and second sides 67, 68 and the top 69 may be formed by bending a piece of metal to form these components or by welding separate pieces to form these components. The first and second sides 67, 68 may have rounded ends that may be the same diameter as the swing arm beam 20. The air spring support 18 is securely attached to the swing arm beam 20 by welding or attached in another way.

A spindle arm 21 is attached to the swing arm assembly 17 at an end of the swing arm beam 20 that is axially spaced from and opposite the swing arm 19. The spindle arm 21 is formed with a first opening 74 and a second opening 78. The first and second openings 74, 78 may be round openings. The swing arm beam 20 may be projected at least partially through the first opening 74 and may be rigidly secured to the spindle arm 21 in this position. An end cap may be fastened to the end to the swing arm beam 20 to close an open area of the swing arm beam 20 when the beam is hollow as shown in FIG. 4. A cylindrical member 77 is inserted in the second opening 78 and is rigidly secured to the spindle arm 21 in this position. The assembled bushing 48 is mounted within the cylindrical member 77 so that the swing arm assembly 17 is pivotable around axis 100 when the swing arm assembly 17 is attached to and extends axially outward from the frame mount assembly 7. A spindle 99 is mounted to the spindle arm 21 adapted to allow a circular brake assembly to be mounted on the spindle arm 21. The spindle arm 21 may be formed with a third opening that may be a circular opening in which one end of a spindle 99 is secured preferably by welds. A hub assembly mounting plate 76 is secured to spindle 99 for subsequent attachment of a wheel hub/circular break assembly.

Figure 11:
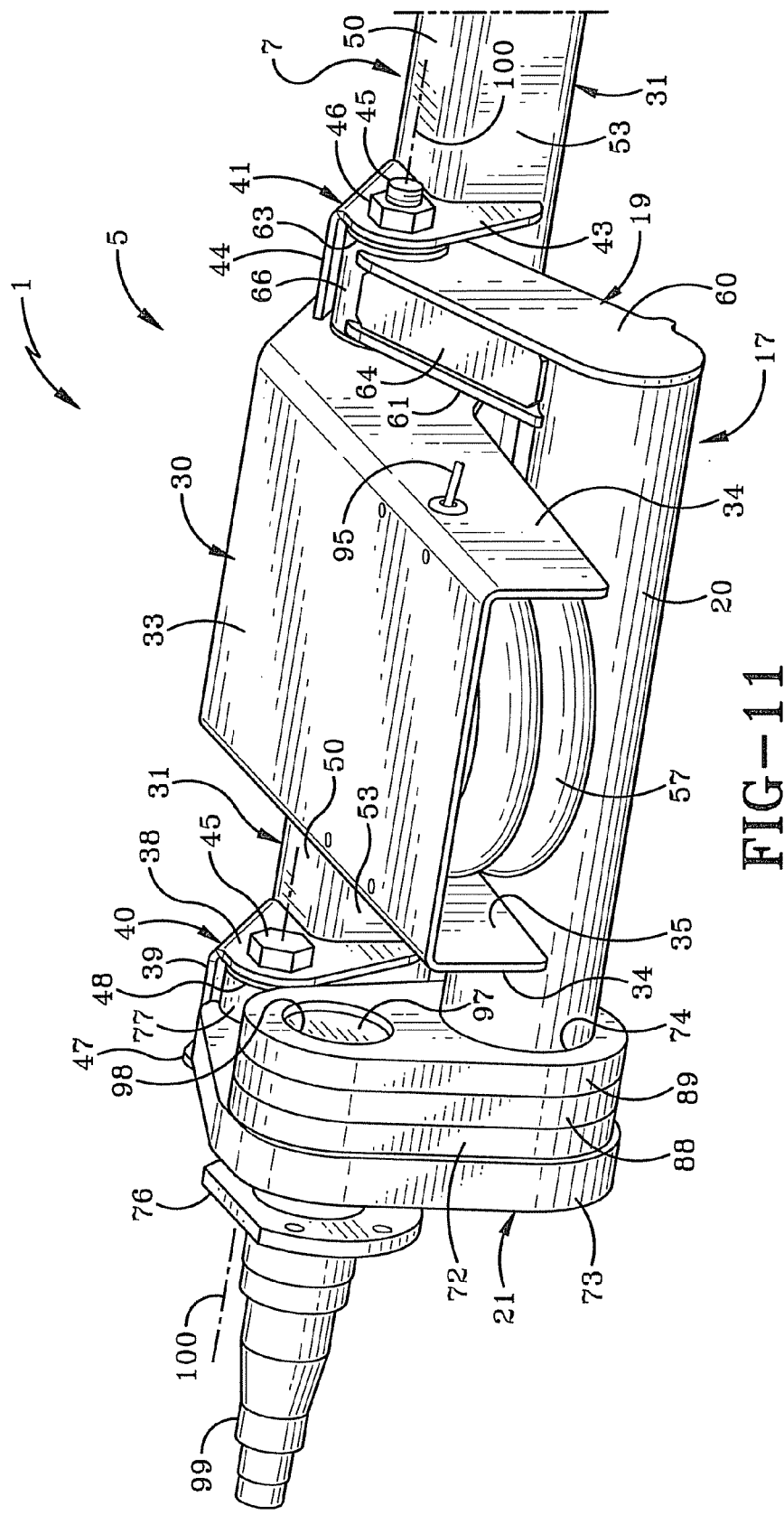
FIG. 11 is a view of the improved suspension assembly with additional spindle arm reinforcing plates.

The spindle arm 21 shown in FIG. 4 includes a vertical main plate 73 and a second parallel reinforcing plate 72. In the preferred embodiment, these two plates 72, 73 can be welded together to provide a more solid and durable spindle arm 21. As shown in FIG. 11, a third parallel plate 88 and a fourth parallel plate 89 can be added to the spindle arm 21 to increase the strength and durability of the spindle arm 21 to allow the trailer to carry additional weight. Different numbers of reinforcing plates can be used than what is shown in the figures.

As previously mentioned, the swing arm assembly 17 is pivotally mounted to the first pivot mount 40 and the second pivot mount 41 to rotate about the swing arm assembly pivot axis 100. The swing arm assembly 17 is pivotally mounted by passing bolts 45 through the first assembled bushing 48 and the second assembled bushing 63 in the air spring assembly 17 and securing nuts 46 to the bolts. One or more nuts 46 and one or more washers may be used to secure the swing arm assembly 17 to the frame mount assembly 7. The assembled bushings 48, 63 can be elastomeric bushings or other suitable bushings.

An air spring 57 is secured at its lower end to the air spring mount 18 by a plurality of bolts 70 (FIG. 4). The air spring 57 is secured at its upper end by bolts 81 to an air spring bracket 82. The air spring bracket 82 is bolted with a plurality of bolts 80 to the top wall 33 of the air spring housing 30. In the preferred embodiment, nuts 84 (FIG. 8) may be pre-attached or pre-welded to a bottom surface of the top 33 of the air spring housing 30 and the bolts 80 may be screwed into and fastened to these pre-welded nuts 84.

The air spring 57 is of a usual well-known construction having a flexible outer sleeve forming an internal air chamber. The air spring 57 is shown as a double convolute air spring, but could have a single convolute or more than two convolutes. Furthermore, the air spring 57 can use various types of internal fluid for its operation, although air is the preferred fluid which is supplied to the internal fluid chamber from a compressor (not shown) usually mounted within the tractor or trailer 2 and connected to a coupling by an air supply line 95.

The manner of operation of the suspension assembly 5 is best shown in FIGS. 8-10. These Figures also illustrate the compact configuration of the suspension assembly 5 fitting within a diameter of a tire mounted to the suspension assembly 5. As previously mentioned, a significant portion of the components of the suspension assembly 5 are mounted above the bottom surface 52 of the frame rail 4. This allows the trailer 2 to be lower to the ground with a lower center of gravity which prevents tipping of the trailer 2. Because a significant portion of the suspension assembly 5 is above the bottom surface 52 of the rail 4, the suspension assembly 5 is further away from dirt located on a surface the trailer 2 travels so the suspension assembly will stay cleaner.

FIG. 8 shows the position of the air spring 57 and the swing arm assembly 17 in the jounce position. The illustrated position is the nearly full jounce position. In the preferred embodiment, the air spring 57 is entirely within the air spring mounting chamber 35 when the suspension assembly 5 is in the jounce position. The jounce position is encountered when the trailer 2 is driven over a bump or over a curb. When this occurs, an upward force is applied to the suspension assembly 1, causing the swing arm assembly 17 to be rotated counterclockwise (as viewed in FIGS. 8-10) about the swing arm suspension assembly pivot axis 100. As previously noted, the swing arm assembly pivot axis 100 is located above the bottom surface 52 of the frame rail 4, as is spindle axis 101. In the preferred embodiment, the spindle axis 101 is about 3.2 inches higher than the bottom surface 52 of the frame rail 4 when the swing arm assembly 17 is in the jounce position as shown by Dimension A in FIG. 8. This allows for the spindle axis 101 to move substantially vertically when the upward force is initially encountered. The substantially vertical movement reduces the walking of the trailer when the trailer is unloaded and/or loaded while docked. Also, unlike prior art suspension assemblies, the air spring 57 is located between the top surface 51 and the bottom surface 52 of the frame rail 4 when the suspension assembly is in the jounce position as shown in FIG. 8. Additionally, in this position, the spindle axis 101 of the spindle 99 is above the bottom surface 52 of the frame rail 4.

Rebound results when energy stored in the air spring 57 as a result of a tire rolling over a bump, etc., begins to push the air spring 57 away from the compressed jounce position. Rebound may also occur when the tire falls into a pothole.

During rebound, the air springs in the suspension system 1 try to return to their original heights but due to inertia in the system may travel beyond into a position which extends them to their rebound limit as generally illustrated in FIG. 10. FIG. 10 shows the full rebound position where the air spring is extended and the swing arm assembly 17 is extended in a clockwise direction (as viewed in FIGS. 8-10) from the design position. In the preferred embodiment, the spindle axis 101 is about 2.04 inches below the bottom surface 52 of the frame rail 4 as shown by Dimension B in FIG. 10 when the swing arm assembly 17 is in the rebound position.

After a force is encountered, eventually the force is dissipated over time throughout the suspension assemblies 5 of the trailer 2. After the force has been dissipated and there are no forces other than the weight of the trailer acting on the suspension assembly 5, the suspension assembly 5 will return to a steady state design position as shown in FIG. 9. In that position, the spindle axis 101 is above the bottom surface 52 of the rail 4. In the preferred embodiment, the spindle axis 101 is about 0.65 inches above the bottom surface 52 of the frame rail 4 in the design position as shown by Dimension C in FIG. 9. A substantial portion of the air spring 57 is also above the bottom portion of the rail 4 in the design position.

The reduced length between the swing arm assembly pivot axis 100 and the spindle axis 101 will provide for a lower torque at the swing arm assembly pivot axis 100. Lowering this torque lowers stresses placed on the various components of the suspension assembly 5 as compared to prior art suspension assemblies. Lighter materials can be used to form the suspension assembly 5 because the stresses are reduced. Also, because the stresses are reduced, the chance of breakage or failure of the suspension system 5 is reduced.

The suspension assemblies 5 of the trailer 2 operate independent of one another. The independent suspension assemblies provide desired trailer stability by absorbing the various twisting and up and down or side to side movement exerted on the trailer wheels 6. The independent side-to-side absorption or compliance of the suspension assemblies 5 provides roll control for stability and diagonal compliance to allow the suspension assemblies 5 to function on uneven terrain. This allows the suspension assemblies 5 to travel over one wheel bumps or encounter diagonal bumps.

The suspension system 1 provides considerable advantages over prior art suspension systems because the length between the swing arm assembly pivot axis 100 and the spindle axis 101 is reduced. This allows the length of the swing arm assembly 17 to be reduced and allows and the air spring 57 to be positioned closer to the swing arm assembly pivot axis 100 than the prior art. When the air spring 57 is at position away from the pivot axis 100 as shown in FIG. 8, the outer diameter of the air spring 57, whether it be a single or multiple convolute type of air spring, a portion of the elastomeric blade of air spring 57 most preferably is spaced forward of the spindle axis 101 as represented by Dimension D. In prior art suspension systems the outermost circumference or surface of air the spring is always rearward of the spindle axis.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 12:
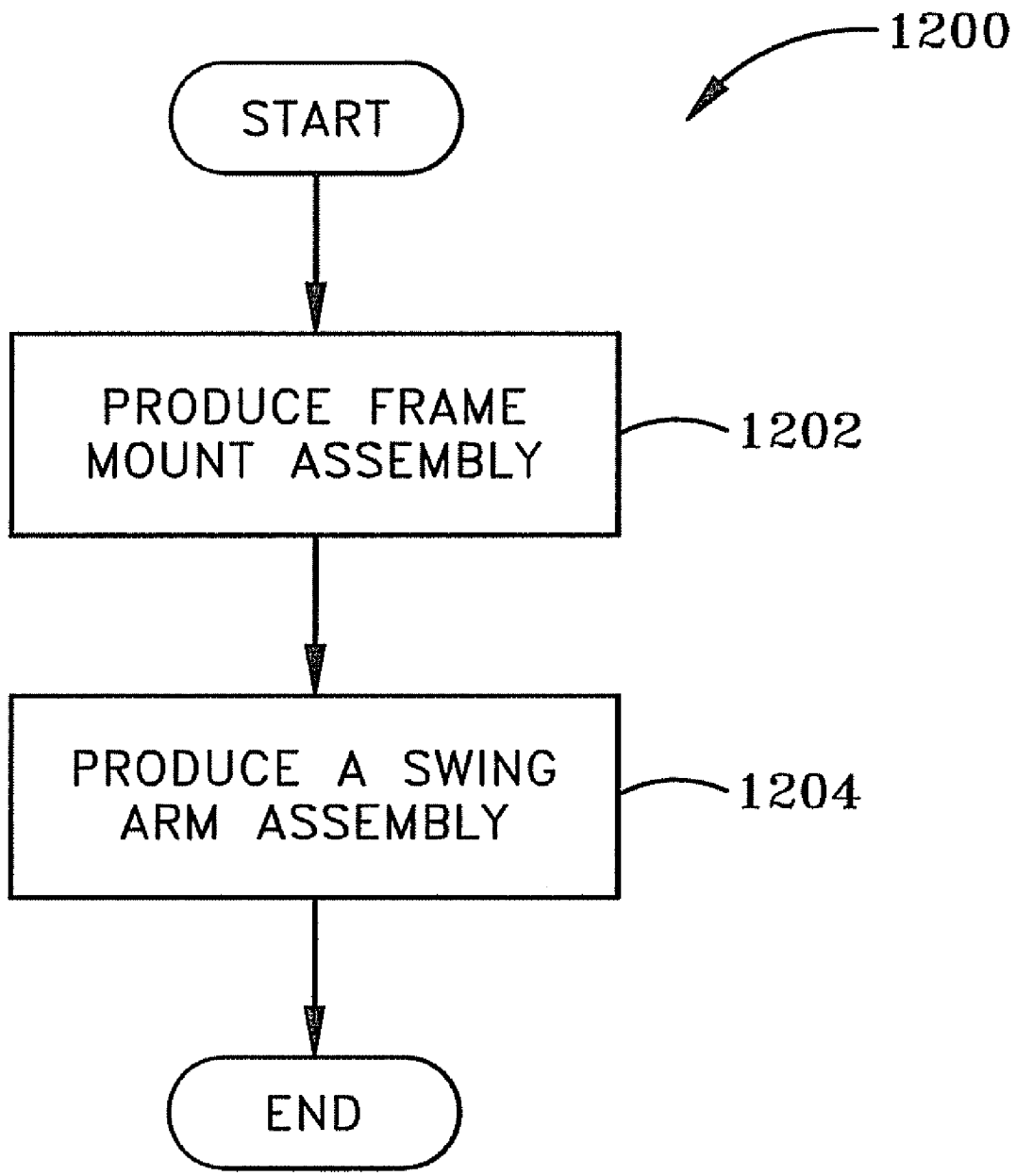
FIG. 12 is a method associated with the improved suspension assembly.

FIG. 12 illustrates a second embodiment of a method 1200 of producing a suspension assembly. For example, a suspension assembly may be fabricated and at least partially assembled. The fabricated suspension assembly may be packed and stored for later delivery to a customer. Later a customer may order one or more manufactured suspension assemblies for shipment to the customer. The customer can install the suspension assemblies onto a vehicle such as a trailer when they arrive at the customer's location. The customer may be a factory that produces completed trailers.

The method 1200 begins by producing a frame mount assembly, at 1202. The frame mount assembly is adapted for mounting a suspension assembly to a trailer or another vehicle. A swing arm assembly is produced, at 1204. The swing arm may be generally U-shaped. Two arms of the U-shaped swing arm are adapted to be pivotally attached to the frame mount assembly at a suspension pivot axis that passes through two arms forming the U-shape. The pivot axis is near the end of each of the two arms. When the suspension assembly is mounted to a trailer, the pivot axis is located above a bottom surface of a rail of the trailer. The two arms are on opposite sides of the rail when the suspension assembly is mounted to the trailer.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A vehicle suspension assembly for use on a trailer with a rail with a top rail surface and a bottom rail surface comprising:
   a frame mount assembly with a first end and a second end adapted to be mounted to the rail, wherein the frame mount assembly further comprises:
   a swing arm assembly pivot axis at the first end of the frame mount assembly, wherein the swing arm assembly pivot axis is located above the bottom rail surface;
   a swing arm assembly adapted to pivot about the swing arm assembly pivot axis;
   a spindle with a spindle axis attached to the swing arm assembly; and
   an air spring attached adjacent the second end of the frame mount assembly and attached to the swing arm assembly; wherein the vehicle suspension assembly is attached to the trailer where the frame mount assembly is mounted to the rail and the vehicle suspension assembly is free of other attachment points.

2. The vehicle suspension assembly of claim 1 wherein the spindle axis is above the bottom rail surface.

3. The vehicle suspension assembly of claim 1 wherein the air spring in its entirety is higher than the bottom rail surface when the vehicle suspension assembly is in a jounce position.

4. The vehicle suspension assembly of claim 1 wherein the swing arm assembly is U-shaped with two ends, and wherein the swing arm assembly pivot axis passes through the two ends.

5. The vehicle suspension assembly of claim 1 wherein the swing arm assembly is pivotally attached to the frame mount assembly at the swing arm assembly pivot axis.

6. The vehicle suspension assembly of claim 1 wherein the swing arm assembly comprises:
    an inside swing arm with a first swing arm end and a second swing arm end;
    a spindle arm with a first spindle arm end and a second spindle arm end, wherein the spindle is attached to the spindle arm;
    a swing arm beam with a first beam end and a second beam end; and
    wherein the first swing arm end is connected to the first beam end and the first spindle arm end is connected to the second beam end, and wherein the swing arm assembly pivot axis passes through the second swing arm end and the second spindle arm end.

7. The vehicle suspension assembly of claim 6 further comprising:
    an opening formed in the spindle arm, and wherein the swing arm beam passes through the opening.

8. The vehicle suspension assembly of claim 6 wherein the spindle arm further comprises:
    two or more plates, wherein the spindle arm is formed by layering the two or more plates together.

9. The vehicle suspension assembly of claim 1 wherein the frame mount assembly further comprises:
    a support beam with a first support beam end and a second support beam end;
    an air spring housing mounted to the support beam and connected to one end of the air spring;
    a first pivot assembly mounted at the first support beam end;
    a second pivot assembly mounted on the support beam end; and
    wherein the swing arm assembly pivot axis passes through the first pivot assembly and the second pivot assembly, and wherein the swing arm assembly is connected to the frame mount assembly at the first pivot assembly and the second pivot assembly.

10. The vehicle suspension assembly of claim 9 wherein the air spring housing forms at least one wall of the second pivot assembly.

11. The vehicle suspension assembly of claim 9 wherein the support beam further comprises:
    an upper support beam surface; and
    wherein the first pivot assembly, the second pivot assembly and the air spring housing extend upward from the upper support beam surface.

12. The vehicle suspension assembly of claim 11, wherein the upper support beam surface is rigidly attached to the bottom rail surface when the vehicle suspension assembly is mounted to the trailer.

13. The vehicle suspension assembly of claim 1 wherein the vehicle suspension assembly is within the diameter of a wheel mounted to the vehicle suspension assembly.

14. The vehicle suspension assembly of claim 1 wherein the spindle axis is between the swing arm assembly pivot axis and the center of the air spring.

15. The vehicle suspension assembly of claim 1 wherein the spindle axis is located above the swing arm assembly pivot axis when the vehicle suspension assembly is in the jounce position.

16. The vehicle suspension assembly of claim 1 wherein the vehicle suspension assembly is adapted to operate independently of another vehicle suspension assembly on another side of the trailer.

17. The vehicle suspension of claim 1 wherein the trailer has a left side and a right side, wherein the suspension assembly is a left side suspension assembly and further comprising:
    a right suspension assembly;
    wherein the frame mount assembly further comprises:
    a support beam adapted to be mounted to the rail so that a left end of the support beam is on the left side of the trailer and a right end of the support beam is on the right side of the trailer, wherein the left side suspension assembly is attached to the left end of the support beam and the right side suspension assembly is attached to right end of the support beam.

18. The vehicle suspension of claim 17 wherein the support beam is adapted to send bending forces between the right end of the support beam and the left end of the support beam.

19. A vehicle suspension assembly for use on a trailer with a rail with a top rail surface and a bottom rail surface comprising:
    a frame mount assembly with a first end and a second end adapted to be mounted to the rail, wherein the frame mount assembly further comprises:
    a swing arm assembly pivot axis at the first end of the frame mount assembly,
    wherein the swing arm assembly pivot axis is located above the bottom rail surface;
    a swing arm assembly adapted to pivot about the swing arm assembly pivot axis;
    a spindle with a spindle axis attached to the swing arm assembly;
    an air spring attached adjacent the second end of the frame mount assembly and attached to the swing arm assembly;
    wherein the swing arm assembly comprises:
    an inside swing arm with a first swing arm end and a second swing arm end;
    a spindle arm with a first spindle arm end and a second spindle arm end, wherein the spindle is attached to the spindle arm;
    a swing arm beam with a first beam end and a second beam end; and
    wherein the first swing arm end is connected to the first beam end and the first spindle arm end is connected to the second beam end, and wherein the swing arm assembly pivot axis passes through the second swing arm end and the second spindle arm end; and
    wherein when the vehicle suspension assembly is mounted to the trailer, the inside swing arm is on one side of the rail and the spindle arm is on the other side of the rail.

20. A vehicle suspension assembly for use on a trailer with a rail with a top rail surface and a bottom rail surface comprising:
    a frame mount assembly with a first end and a second end adapted to be mounted to the rail, wherein the frame mount assembly further comprises:

a swing arm assembly pivot axis at the first end of the frame mount assembly, wherein the swing arm assembly pivot axis is located above the bottom rail surface;

a swing arm assembly adapted to pivot about the swing arm assembly pivot axis;

a spindle with a spindle axis attached to the swing arm assembly;

an air spring attached adjacent the second end of the frame mount assembly and attached to the swing arm assembly;

wherein the frame mount assembly further comprises:

a support beam with a first support beam end and a second support beam end;

an air spring housing mounted to the support beam and connected to one end of the air spring;

a first pivot assembly mounted at the first support beam end;

a second pivot assembly mounted on the support beam end;

wherein the swing arm assembly pivot axis passes through the first pivot assembly and the second pivot assembly, and wherein the swing arm assembly is connected to the frame mount assembly at the first pivot assembly and the second pivot assembly; and wherein the rail is between the first pivot assembly and the air spring housing, and wherein the air spring housing is between the rail and the second pivot assembly.

21. A suspension assembly comprising:

a frame mount assembly adapted to be mounted to a trailer;

a U-shaped swing arm adapted to straddle a rail of the trailer, wherein the rail has a top surface and a bottom surface, wherein the swing arm further comprises:

a first arm;

a second arm, wherein the first arm is on one side of the rail and the second arm is on an opposite side of the rail;

a swing arm pivot axis above the bottom surface of the rail, wherein one end of the first arm and one end of the second arm are connected to the frame mount assembly at the swing arm pivot axis; and an air spring connected between the frame mount assembly and an end of the U-shaped swing arm opposite the swing arm pivot axis.

22. A method of producing a suspension assembly comprising:

producing a frame mount assembly for mounting a suspension assembly to a trailer; and producing a U-shaped swing arm assembly with two arms adapted to be pivotally attached to the frame mount assembly at a suspension pivot axis, wherein the pivot axis is located above a bottom surface of a floor rail of the trailer, wherein the two arms are on opposite sides of the floor rail when the suspension assembly is mounted to the trailer.

23. A suspension assembly comprising:

a frame mount assembly adapted to be mounted to a vehicle;

a U-shaped swing arm with a first arm and a second arm adapted to straddle a rail of the vehicle, wherein the first arm is on one side of the rail and the second arm is on an opposite side of the rail;

a swing arm pivot axis with one end of the first arm and one end of the second arm connected to the frame mount assembly at the swing arm pivot axis with the U-shaped swing arm adapted to pivot about the swing arm pivot axis;

a spindle mounted to one end of the swing arm; and an air spring connected between the frame mount assembly and an end of the U-shaped swing arm opposite the swing arm pivot axis.

24. The suspension assembly for use on a trailer of claim 23, wherein the frame mount assembly, U-shaped swing arm, spindle and air spring are pre-assembled so that the vehicle suspension assembly only need to be mounted to the vehicle by fastening the frame mount assembly to the vehicle.

* * * * *